Patented Oct. 5, 1948

2,450,754

UNITED STATES PATENT OFFICE 2,450,754

PROCESS FOR PREPARING ENOL ACETATES OF ALPHA-DIKETONES

Hugh J. Hagemeyer, Jr., Kingsport, Tenn., assignor to Eastman Kodak Company, Rochester, N. Y., a corporation of New Jersey No Drawing. Application October 24, 1946, Serial No. 705,479

7 Claims. (Cl. 260—491)

This invention relates to enol acetates prepared from α-diketones and α-ketocarboxylic esters.

The mono enol acetate of biacetyl has been prepared by the interaction of ketene and biacetyl in the presence of sulfuric acid. See Spence and Degering, Jour. Am. Chem. Soc. 66, 1624 (1944) and Hurd, ibid. 66, 2013 (1944).

I have now found that isopropenyl acetate acts upon biacetyl, in the presence of an acid, to give not only the mono enol acetate but the di enol acetate as well. I have found that isopropenyl acetate has many advantages over ketene in the preparation of enol acetates. The acetylations are easier to control, the yields are higher and the enol acetates are purer. I have further found that enol acetates can be prepared from other α-diketones and from α-ketocarboxylic esters, using isopropenyl acetate.

It is, accordingly, an object of my invention to provide enol acetates. A further object is to provide a process for preparing enol acetates. Other objects will become apparent hereinafter.

In accordance with my invention, I prepare enol acetates by condensing isopropenyl acetate with an α-diketone selected from those represented by the following general formula:

I. 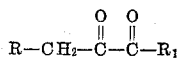

wherein R represents a member selected from the group consisting of a hydrogen atom and an alkyl group, and $R_1$ represents an alkyl group, in the presence of at least one acid catalyst. I prepare enol acetates from α-ketocarboxylic esters by condensing isopropenyl acetate with an α-ketocarboxylic ester selected from those represented by the following general formula:

II. 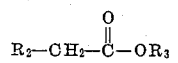

wherein $R_2$ represents a member selected from the group consisting of a hydrogen atom and an alkyl group and $R_3$ represents an alkyl group.

Typical α-diketones represented by the above formula I are: biacetyl (diacetyl), acetylpropionyl, dipropionyl, acetyl-n-butyryl, acetylcaproyl, acetylisocaproyl, acetylisovaleryl, acetylisobutyryl, dipropionyl, di-n-butyryl, diisobutyryl, propionyl-n-butyryl, propionylvaleryl, etc.

Typical α-ketocarboxylic esters represented by the above general formula II are: methyl pyruvate, ethyl pyruvate, n-propyl pyruvate, n-amyl pyruvate, isoamyl pyruvate, benzyl pyruvate, hexadecyl pyruvate, allyl pyruvate, methyl 1-ketobutyrate, ethyl 1-ketobutyrate, ethyl 1-keto-n-caproate, ethyl 1-ketoisocaproate, ethyl 1-ketoisovalerate, ethyl 1-keto-n-valerate, isobutyl 1-keto-n-valerate, etc.

Typical acid catalysts are hydrochloric acid, hydrobromic acid, sulfuric acid, sulfamic acid, chlorosulfonic acid, fluorosulfonic acid, methyl and ethylsulfuric acids, N-acetylsulfamic acid, N,N-dimethylsulfamic acid, benzenesulfonic acid, p-toluenesulfonic acid, ortho phosphoric acid, selenic acid, etc. The group of acid catalysts represented by the following general formula are especially efficacious:

III. 

wherein X represents a halogen atom or a group of atoms containing a non-metallic atom selected from the group consisting of a nitrogen atom and an oxygen atom, said group of atoms being linked to the S atom through said non-metallic atom.

Advantageously the acid catalyst is added to the isopropenyl acetate which is then added to the α-diketone or α-ketocarboxylic ester. The mixture is then allowed to stand for several hours to come to equilibrium. The acetone (which is generated during the condensation) is then distilled off through a short column. More advantageously the mixture is heated under a still head. When the still head temperature has reached its lowest point under total reflux, the take-off is adjusted so as to maintain this temperature and the acetone which is formed slowly distills off. In some cases the equilibrium is such that the still head temperature does not necessarily reach the boiling point of acetone, and after a period of refluxing the temperature is raised to distill off the acetone. The acetone obtained is a measure of the completeness of the condensation, since for each mole of isopropenyl acetate used up in acetylation, one mole of acetone is formed. It is preferable to keep the still pot temperature as low as possible (below 100° C.) especially when employing pyruvates. Following removal of the acetone, the residue of enol acetate is distilled preferably under reduced pressure. The catalyst is advantageously neutralized with sodium acetate or sodium bicarbonate before distilling the final products.

The following examples will serve to illustrate further the manner of practicing my invention.

*Example 1.—α-Acetylvinylacetate and 2,3-diacetoxybutadiene-1,3*

84 g. of biacetyl, 250 g. of isopropenyl acetate, and a mixture of 1 g. of p-toluenesulfonic acid and 1 ml. of sulfuric acid, were refluxed with a slow rate of take-off for 24 hours. During this period the acetone which was formed was slowly removed. The catalyst was now neutralized with anhydrous sodium acetate. The neutralized reaction mixture was distilled under reduced pressure, and 32 grams of α-acetylvinylacetate (the mono enol acetate) and 20 grams of 2,3-diacetoxybutadiene-1,3 boiling at 32° C. and 53° C. respectively, at 5 mm. of mercury pressure, were obtained. The α-acetylvinylacetate has the following formula:

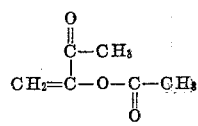

and physical constants: $N_D^{20}$ 1.3911;

$D_{20}^{20}$ 1.082

The 2,3-diacetoxybutadiene-1,3 has the following formula:

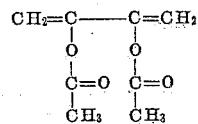

and physical constants: $N_D^{20}$ 1.4372;

$D_{20}^{20}$ 1.076

*Example 2.—Methyl α-acetoxyacrylate*

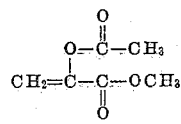

17 g. of methyl pyruvate and 30 g. of isopropenyl acetate containing 1.2 g. of sulfuric acid were refluxed with a take-off bead to remove the acetone. When the theoretical quantity of acetone had distilled off, the residue was treated with anhydrous sodium acetate to neutralize the catalyst. The neutralized reaction mixture was distilled under reduced pressure and methyl α-acetoxyacrylate distilled over at 53.4° C. at 5 mm. of Hg pressure. The methyl α-acetoxyacrylate was redistilled at 112° C. at 100 mm. of Hg pressure. $N_D^{20}$ 1.4089;

$D_{20}^{20}$ 1.0913

In the same manner shown in Example 1, acetylpropionyl can be acetylated to give an enol acetate, using 100 g. of acetyl propionyl instead of the diacetyl; dipropionyl can be acetylated using 114 g. of dipropionyl, di-n-butyryl can be acetylated using 142 g. of di-n-butyryl; diisobutyryl can be acetylated using 142 g. of diisobutyryl, etc. In the same manner shown in Example 2, ethyl pyruvate can be acetylated using 20 g. of ethyl pyruvate instead of methyl pyruvate; n-propyl pyruvate can be acetylated using 22 g. of n-propyl pyruvate, n-amyl pyruvate can be acetylated using 27 g. of n-amyl pyruvate, methyl 1-ketobutyrate can be acetylated using 20 g. of methyl 1-ketobutyrate, etc.

The enol acetates obtained in accordance with my invention readily add chlorine and bromine at the carbon-to-carbon double bonds, and can be employed to prepare dichlorides and dibromides.

The dienol acetate obtained from biacetyl, viz. 2,3-diacetoxybutadiene-1,3 is a new composition of matter.

α-Diketones of the above general formula I wherein R represents a member selected from the group consisting of a hydrogen atom and an alkyl group containing from 1 to 3 carbon atoms, and $R_1$ represents a member selected from the group consisting of a primary alkyl group containing from 1 to 4 atoms and an isopropyl group are especially useful in practicing my invention. α-Ketocarboxylic esters of the above general formula II wherein $R_2$ represents a member selected from the group consisting of a hydrogen atom and a primary alkyl group containing from 1 to 5 carbon atoms, and $R_3$ represents a primary alkyl group containing from 1 to 5 carbon atoms, are especially useful in practicing my invention.

What I claim as my invention and desire to be secured by Letters Patent of the United States is:

1. A process for preparing enol acetates comprising condensing, in the presence of an acid catalyst, isopropenyl acetate with a compound selected from the group consisting of the α-diketones represented by the following general formula:

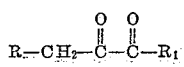

wherein R represents a member selected from the group consisting of a hydrogen atom and an alkyl group containing from 1 to 3 carbon atoms, and $R_1$ represents a member selected from the group consisting of a primary alkyl group containing from 1 to 4 carbon atoms and an isopropyl group.

2. A process for preparing enol acetates comprising condensing, in the presence of sulfuric acid, isopropenyl acetate with diketones represented by the following general formula:

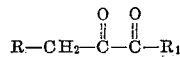

wherein R represents a member selected from the group consisting of a hydrogen atom and an alkyl group containing from 1 to 3 carbon atoms, and $R_1$ represents a member selected from the group consisting of a primary alkyl group containing from 1 to 4 carbon atoms and an isopropyl group.

3. A process for preparing enol acetates comprising condensing, in the presence of sulfuric acid, ispropenyl acetate with biacetyl.

4. A process for preparing enol acetates comprising condensing, in the presence of sulfamic acid, isopropenyl acetate with a compound selected from the group consisting of α-diketones represented by the following general formula:

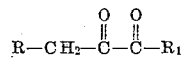

wherein R represents a member selected from the group consisting of a hydrogen atom and an alkyl group containing from 1 to 3 carbon atoms, and $R_1$ represents a member selected from the group consisting of a primary alkyl group containing from 1 to 4 carbon atoms and an isopropyl group.

5. A process for preparing enol acetates comprising condensing, in the presence of sulfamic acid, ispropenyl acetate with biacetyl.

6. A process for preparing enol acetates comprising condensing, in the presence of chlorosulfonic acid, isopropenyl acetate with a compound selected from the group consisting of α-diketones represented by the following general formula:

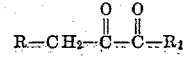

wherein R represents a member selected from the group consisting of a hydrogen atom and an alkyl group containing from 1 to 3 carbon atoms, and R₁ represents a member selected from the group consisting of a primary alkyl group containing from 1 to 4 carbon atoms and an isopropyl group.

7. A process for preparing enol acetates comprising condensing, in the presence of chlorosulfonic acid, ispropenyl acetate with biacetyl.

HUGH J. HAGEMEYER, Jr.

REFERENCES CITED

The following references are of record in the file of this patent:

UNITED STATES PATENTS

| Number | Name | Date |
|---|---|---|
| 2,342,612 | Hansley et al. | Feb. 22, 1944 |
| 2,355,971 | Hansley et al. | Aug. 15, 1944 |
| 2,407,301 | Spence et al. | Sept. 10, 1946 |
| 2,407,302 | Spence et al. | Sept. 10, 1946 |